US012658778B2

(12) United States Patent
Chen et al.

(10) Patent No.: US 12,658,778 B2
(45) Date of Patent: Jun. 16, 2026

(54) POWER SUPPLY DEVICE AND OPERATION METHOD THEREOF

(71) Applicant: Novatek Microelectronics Corp., Hsinchu (TW)

(72) Inventors: Tuo-Kuang Chen, Hsinchu City (TW);
Jui-Chi Chang, Kaohsiung City (TW);
Yi-Meng Lan, Tainan City (TW);
Yi-Chun Lee, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 314 days.

(21) Appl. No.: 18/325,080

(22) Filed: May 29, 2023

(65) Prior Publication Data

US 2024/0405658 A1     Dec. 5, 2024

(51) Int. Cl.
H02M 1/00     (2007.01)
H02M 3/07     (2006.01)
H02M 3/156    (2006.01)

(52) U.S. Cl.
CPC ....... H02M 1/0045 (2021.05); H02M 1/0025 (2021.05); H02M 3/07 (2013.01); H02M 3/156 (2013.01)

(58) Field of Classification Search
CPC ............. H02M 1/0003; H02M 1/0009; H02M 1/0025; H02M 1/0045; H02M 3/07; H02M 3/156; H02M 3/158; G05F 1/10; G05F 1/40
See application file for complete search history.

(56) References Cited

U.S. PATENT DOCUMENTS

| | | | |
|---|---|---|---|
| 6,002,599 A | 12/1999 | Chow | |
| 9,007,120 B2 * | 4/2015 | Chiu | H02M 3/07 |
| | | | 327/536 |
| 9,780,674 B2 | 10/2017 | Freeman et al. | |
| 9,857,814 B2 | 1/2018 | Cohen et al. | |
| 9,923,457 B2 | 3/2018 | Yang | |
| 10,420,179 B1 | 9/2019 | Chen et al. | |
| 11,431,245 B2 | 8/2022 | Ihs | |
| 2008/0158915 A1 * | 7/2008 | Williams | H02M 3/07 |
| | | | 363/21.06 |

(Continued)

FOREIGN PATENT DOCUMENTS

TW     201424229     6/2014

OTHER PUBLICATIONS

"Office Action of Taiwan Counterpart Application", issued on Jul. 22, 2024, p. 1-p. 11.

*Primary Examiner* — Thienvu V Tran
*Assistant Examiner* — Shahzeb K Ahmad
(74) *Attorney, Agent, or Firm* — JCIPRNET

(57) ABSTRACT

A power supply device and an operation method thereof are provided. The power supply device includes a charge pump circuit and a power supply circuit. The power supply circuit supplies a first power voltage to the charge pump circuit. The charge pump circuit converts the first power voltage into a second power voltage so as to supply the second power voltage to an application circuit. The power supply circuit detects the second power voltage or an output current output by the charge pump circuit to obtain a detection result. The power supply circuit dynamically adjusts the first power voltage based on the detection result.

10 Claims, 8 Drawing Sheets

(56) References Cited

U.S. PATENT DOCUMENTS

| | | | |
|---|---|---|---|
| 2009/0237046 A1* | 9/2009 | Hsieh | H02M 3/07 |
| | | | 323/273 |
| 2011/0248688 A1 | 10/2011 | Tacob et al. | |
| 2013/0069614 A1* | 3/2013 | Tso | H02M 3/07 |
| | | | 323/288 |
| 2013/0148456 A1* | 6/2013 | Cho | G11C 5/145 |
| | | | 365/226 |
| 2013/0320955 A1 | 12/2013 | Kratyuk et al. | |
| 2014/0191742 A1* | 7/2014 | Kung | G05F 1/10 |
| | | | 323/282 |
| 2015/0028839 A1* | 1/2015 | Petrovic | H02M 3/07 |
| | | | 323/311 |
| 2017/0110960 A1* | 4/2017 | Tang | H02M 3/07 |
| 2020/0036285 A1 | 1/2020 | Ozoe | |

* cited by examiner

| Supply a first power voltage by a power supply circuit | S310 |

| Convert the first power voltage into a second power voltage by a charge pump circuit | S320 |

| Detect, by the power supply circuit, the second power voltage or an output current output by the charge pump circuit | S330 |

| Dynamically adjust, by the power supply circuit, the first power voltage based on the detection result | S340 |

$610 \begin{cases} 611 \\ 612 \\ 613 \end{cases}$

POWER SUPPLY DEVICE AND OPERATION METHOD THEREOF

BACKGROUND

Technical Field

The disclosure relates to an electronic device, and especially to a power supply device and the operation method thereof.

Description of Related Art

The power supply device may provide stable rated voltage/current to a load circuit (application circuit). The implementation of a power supply device is one of many technical issues in this technical field.

SUMMARY

The disclosure provides a power supply device and an operation method thereof to stably provide rated voltage/current to an application circuit.

In an embodiment of disclosure, the power supply device includes a charge pump circuit and a power supply circuit. The power supply circuit is coupled to the charge pump circuit to supply the first power voltage. The charge pump circuit converts a first power voltage into a second power voltage so as to supply the second power voltage to an application circuit. The power supply circuit detects the second power voltage or an output current output by the charge pump circuit to obtain a detection result. The power supply circuit dynamically adjusts the first power voltage based on the detection result.

In an embodiment of the disclosure, the operation method is described below. A first power voltage is supplied by a power supply circuit of the power supply device. The first power voltage is converted into a second power voltage by a charge pump circuit of the power supply device, so as to supply the second power voltage to an application circuit. The second power voltage or an output current output by the charge pump circuit is detected by the power supply circuit to obtain a detection result. The first power voltage is dynamically adjusted by the power supply circuit based on the detection result.

Based on the above, the charge pump circuit in the embodiments of the disclosure may convert the first power voltage output by the power supply circuit into the second power voltage required by the application circuit. In order to stably provide rated voltage/current to the application circuit, the power supply circuit may detect the second power voltage output by the charge pump circuit instantly (and/or detect the output current of the charge pump circuit). The power supply circuit may dynamically adjust the first power voltage required by the charge pump circuit based on the detection result, so that the charge pump circuit may stably provide rated voltage/current to the application circuit.

In order to make the above-mentioned features and advantages of the disclosure comprehensible, embodiments accompanied with drawings are described in detail below.

DESCRIPTION OF THE EMBODIMENTS

Figure 1:
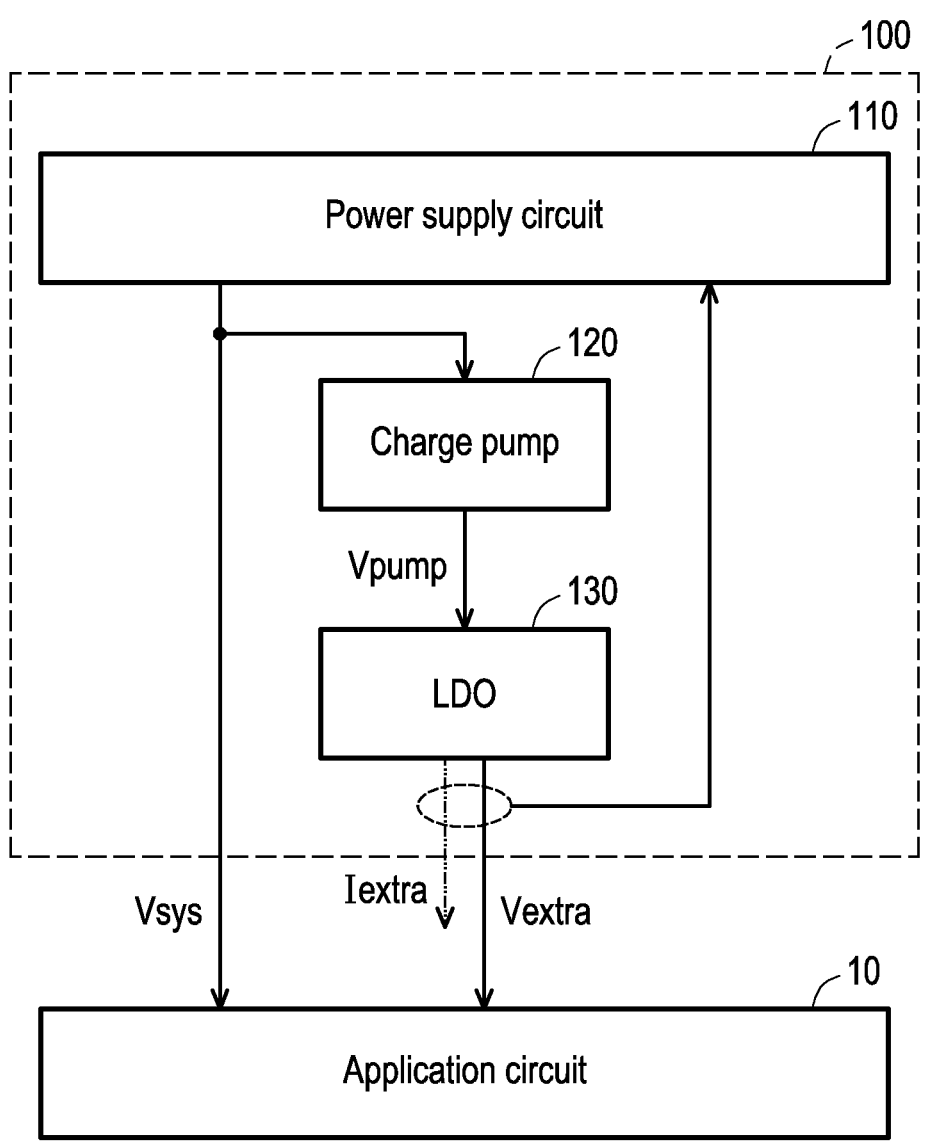
FIG. 1 is a circuit block schematic view of a power supply device according to an embodiment.

The term "coupled (or connected)" as used throughout this specification (including the scope of the application) may refer to any direct or indirect means of connection. For example, if it is described in the specification that a first device is coupled (or connected) to a second device, it should be construed that the first device can be directly connected to the second device, or the first device can be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a circuit block schematic view of a power supply device 100 according to an embodiment. The power supply device 100 shown in FIG. 1 may stably provide rated voltage/current to an application circuit 10. The application circuit 10 shown in FIG. 1 may represent one or more load circuits/elements. Generally, the application circuit 10 needs to be supplied with one or more rated voltage/current. For example, in the embodiment shown in FIG. 1, the power supply device 100 may stably provide two kinds of rated voltages (system voltage Vsys and power voltage Vextra) to the application circuit 10. The actual levels of the system voltage Vsys and the power voltage Vextra may be set according to the power consumption specification of the application circuit 10.

In the embodiment shown in FIG. 1, the power supply device 100 includes a power supply circuit 110, a charge pump 120, and a low-dropout regulator (LDO regulator) 130. The power supply circuit 110 is coupled to the application circuit 10 and the charge pump 120 to supply the system voltage Vsys. The charge pump 120 may convert the system voltage Vsys into a power voltage Vpump. The charge pump 120 could be a DC-to-DC converter. Generally, the charge pump 120 may use a capacitor as an energy storage element to generate an output voltage (power voltage Vpump) greater than an input voltage (system voltage Vsys).

The charge pump 120 may supply the power voltage Vpump to the LDO regulator 130. The LDO regulator 130 might be a linear DC regulator that may provide stable DC voltage power. Compared with general linear DC regulators, the LDO regulator may work with a smaller output-input voltage difference. The LDO regulator 130 may convert the power voltage Vpump into a power voltage Vextra, so as to supply the power voltage Vextra to the application circuit 10. The power supply circuit 110 may detect the power voltage Vextra and/or an output current Iextra output by the charge pump 120 to obtain a detection result. The power supply circuit 110 dynamically adjusts the system voltage Vsys based on the detection result, so that the charge pump 120 may stably provide rated voltage/current to the application circuit 10.

Generally, the voltage difference (voltage difference between Vsys and Vpump) generated by the charge pump 120 is fixed. The greater the voltage difference between the system voltage Vsys and the power voltage Vextra, the greater the voltage difference between the power voltage Vpump and the power voltage Vextra. The voltage difference between the power voltage Vpump and the power voltage Vextra causes a power loss of the LDO regulator 130. A great voltage difference between the power voltage Vpump and the power voltage Vextra causes the temperature of the LDO regulator 130 to rise sharply.

Figure 2:
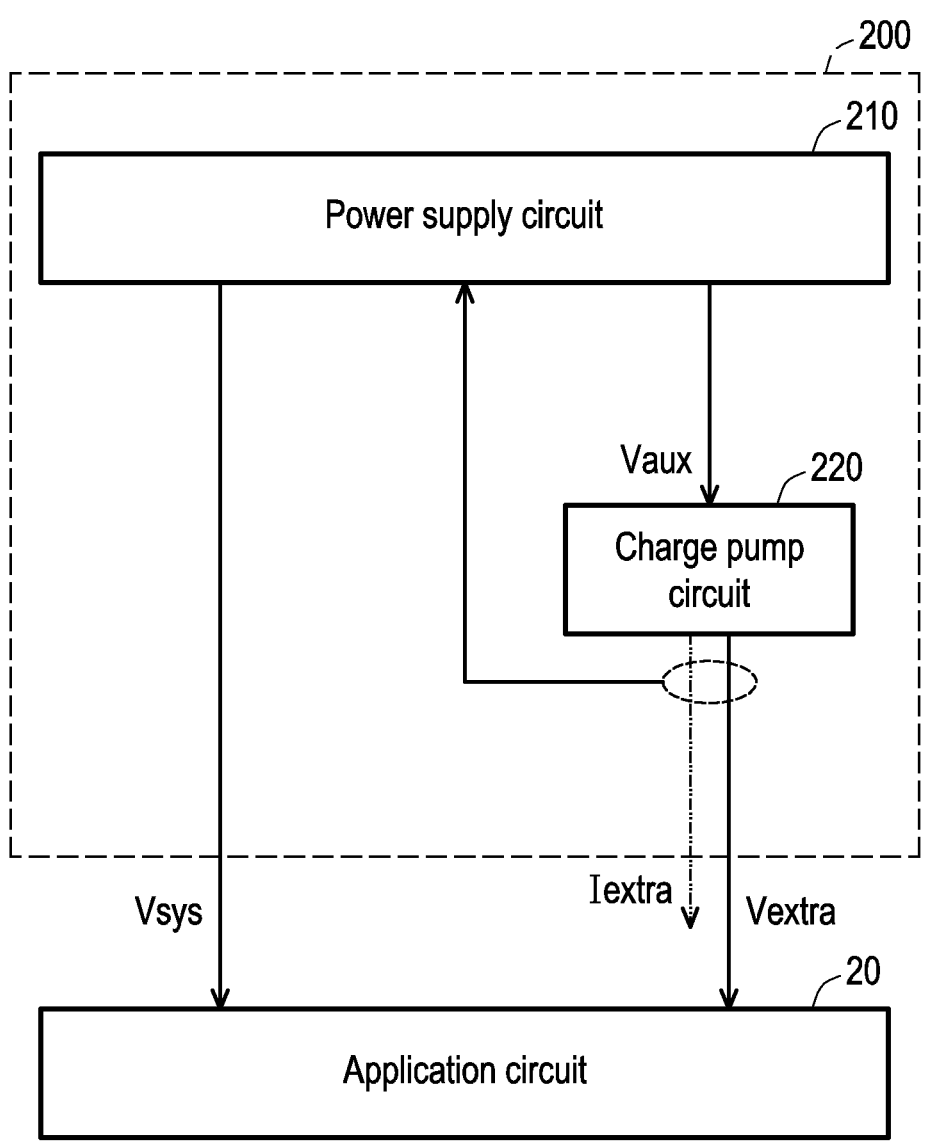
FIG. 2 is a circuit block schematic view of a power supply device according to an embodiment of the disclosure.

FIG. 2 is a circuit block schematic view of a power supply device 200 according to an embodiment of the disclosure. The power supply device 200 shown in FIG. 2 may stably provide rated voltage/current to an application circuit 20. For the application circuit 20 shown in FIG. 2, reference may be made to the related description of the application circuit 10 shown in FIG. 1. In the embodiment shown in FIG. 2, the power supply device 200 may stably provide two kinds of rated voltages (system voltage Vsys and power voltage Vextra) to the application circuit 20. The power supply device 200 includes a power supply circuit 210 and a charge pump circuit 220. The power supply circuit 210 is coupled to the application circuit 20 to supply the system voltage Vsys. The charge pump circuit 220 is coupled to the power supply circuit 210 and the application circuit 20.

Figure 3:
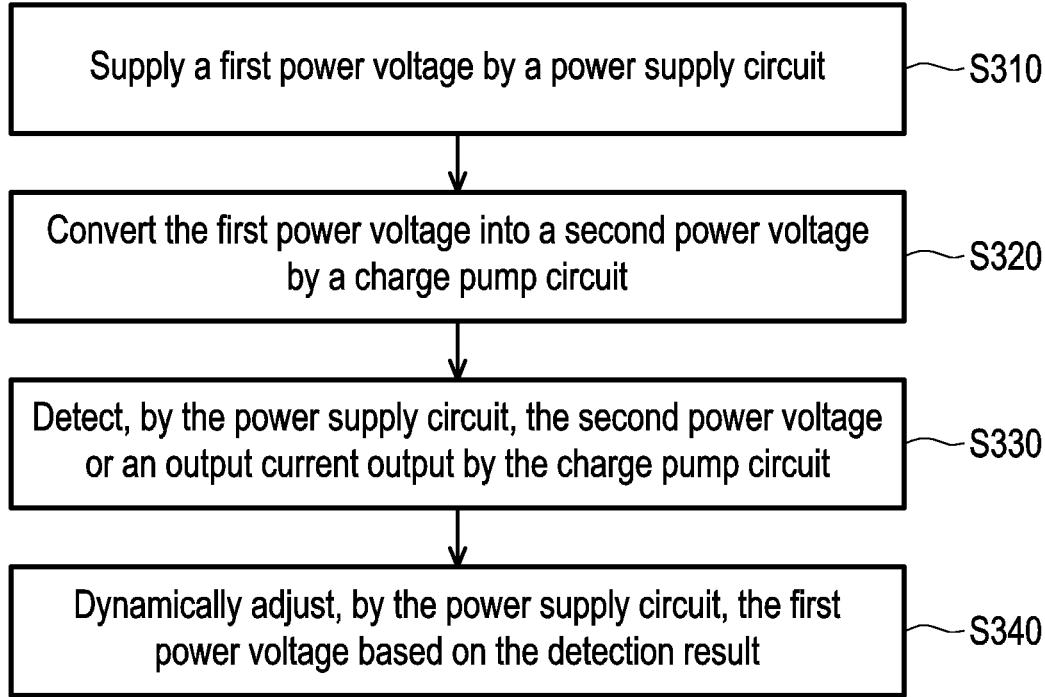
FIG. 3 is a flowchart of an operation method of a power supply device according to an embodiment of the disclosure.

FIG. 3 is a flowchart of an operation method of a power supply device according to an embodiment of the disclosure. Referring to FIG. 2 and FIG. 3, in step S310, the power supply circuit 210 supplies power voltage Vaux (first power voltage) to the charge pump circuit 220. In step S320, the charge pump circuit 220 may convert the power voltage Vaux into a power voltage Vextra (second power voltage), so as to supply the power voltage Vextra to the application circuit 20. In step S330, the power supply circuit 210 may detect the power voltage Vextra and/or the output current Iextra output by the charge pump circuit 220 to obtain a detection result. In step S340, the power supply circuit 210 may dynamically adjust the power voltage Vaux based on the detection result.

To sum up, the charge pump circuit 220 may convert the power voltage Vaux output by the power supply circuit 210 into the power voltage Vextra required by the application circuit 20. In order to stably provide rated voltage/current to the application circuit 20, the power supply circuit 210 may detect the power voltage Vextra output by the charge pump circuit 220 instantly (and/or detect the output current Iextra of the charge pump circuit 220). The power supply circuit 210 may dynamically adjust the power voltage Vaux required by the charge pump circuit 220 based on the detection result, so that the charge pump circuit 220 may stably provide rated voltage/current to the application circuit 20. The power voltage Vaux may be adjusted independently of the system voltage Vsys.

Figure 4:
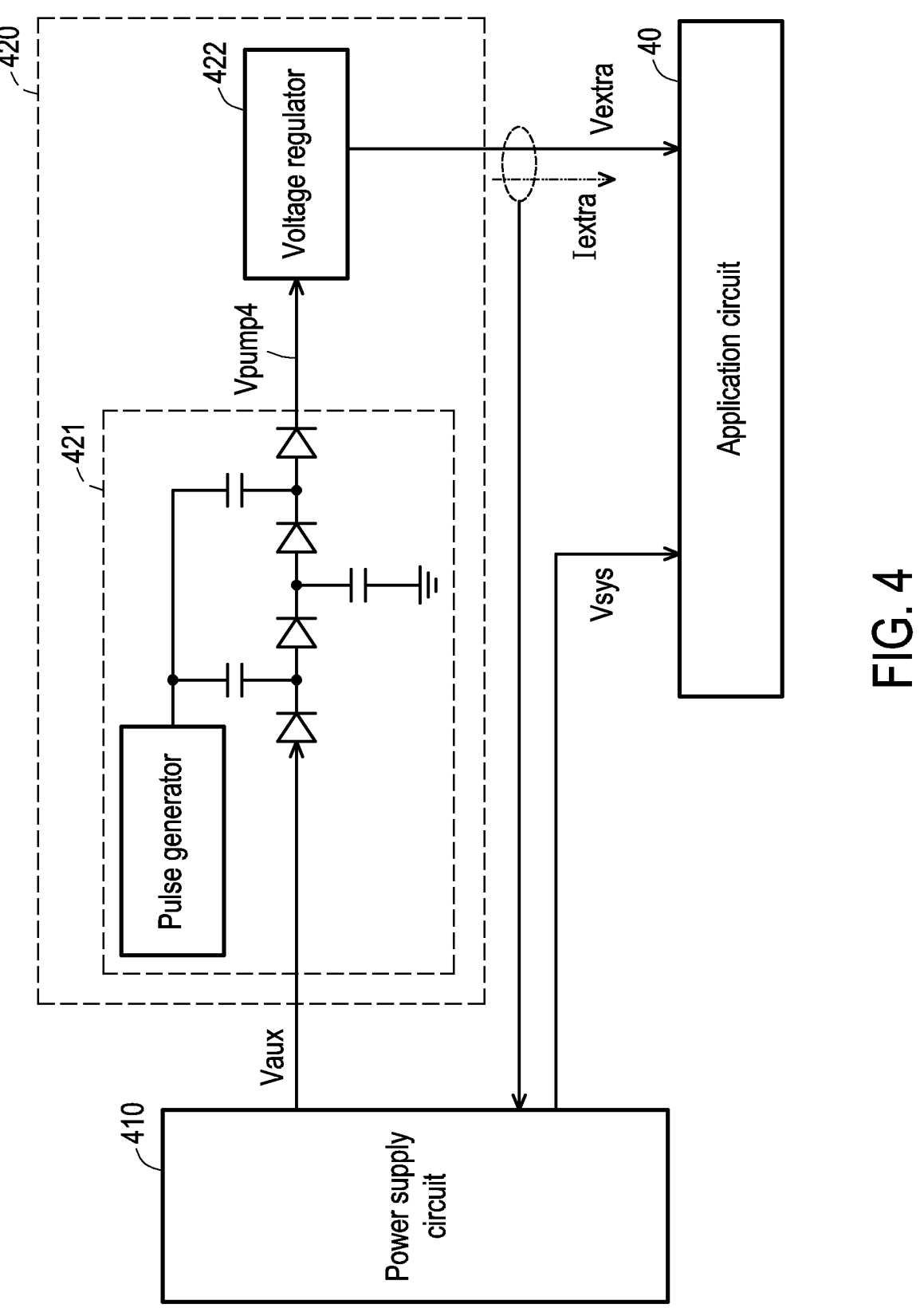
FIG. 4 is a circuit block schematic view of a charge pump circuit according to an embodiment of the disclosure.

FIG. 4 is a circuit block schematic view of a charge pump circuit 420 according to an embodiment of the disclosure. The power supply device shown in FIG. 4 includes a power supply circuit 410 and a charge pump circuit 420. The power supply device, the power supply circuit 410, and the charge pump circuit 420 shown in FIG. 4 may refer to the relevant descriptions of the power supply device 200, the power supply circuit 210, and the charge pump circuit 220 shown in FIG. 2 and may be deduced by analogy. The charge pump circuit 420 shown in FIG. 4 may be used as one of many implementation examples of the charge pump circuit 220 shown in FIG. 2.

In the embodiment shown in FIG. 4, the charge pump circuit 420 includes a charge pump 421 and a voltage regulator 422. The charge pump 421 is coupled to the power supply circuit 410 to receive the power voltage Vaux. The charge pump 421 may convert the power voltage Vaux into a power voltage Vpump4. The charge pump 421 is a DC-to-DC converter. The charge pump 421 may generate an output voltage (power voltage Vpump4) greater than the input voltage (power voltage Vaux). The charge pump 421 shown in FIG. 4 is one of many implementation examples. The implementation of the charge pump 421 may be determined according to the actual design, and is not limited to the charge pump 421 shown in FIG. 4. The voltage regulator 422 is coupled to the charge pump 421 to receive the power voltage Vpump4. Based on actual design, the voltage regulator 422 may include a low dropout (LDO) voltage regulator or other voltage regulators. The voltage regulator 422 may use the power voltage Vpump4 to generate the power voltage Vextra for the application circuit 40. For the application circuit 40 shown in FIG. 4, reference may be made to the related description of the application circuit 10 shown in FIG. 1.

The power voltage Vaux may be adjusted independently of the system voltage Vsys. By setting the power voltage Vaux, the voltage difference between the input voltage (power voltage Vpump4) and the output voltage (power voltage Vextra) of the voltage regulator 422 may be as small as possible, thereby reducing the power loss of the voltage regulator 422 and avoiding the temperature rise of the voltage regulator 422.

Figure 5:
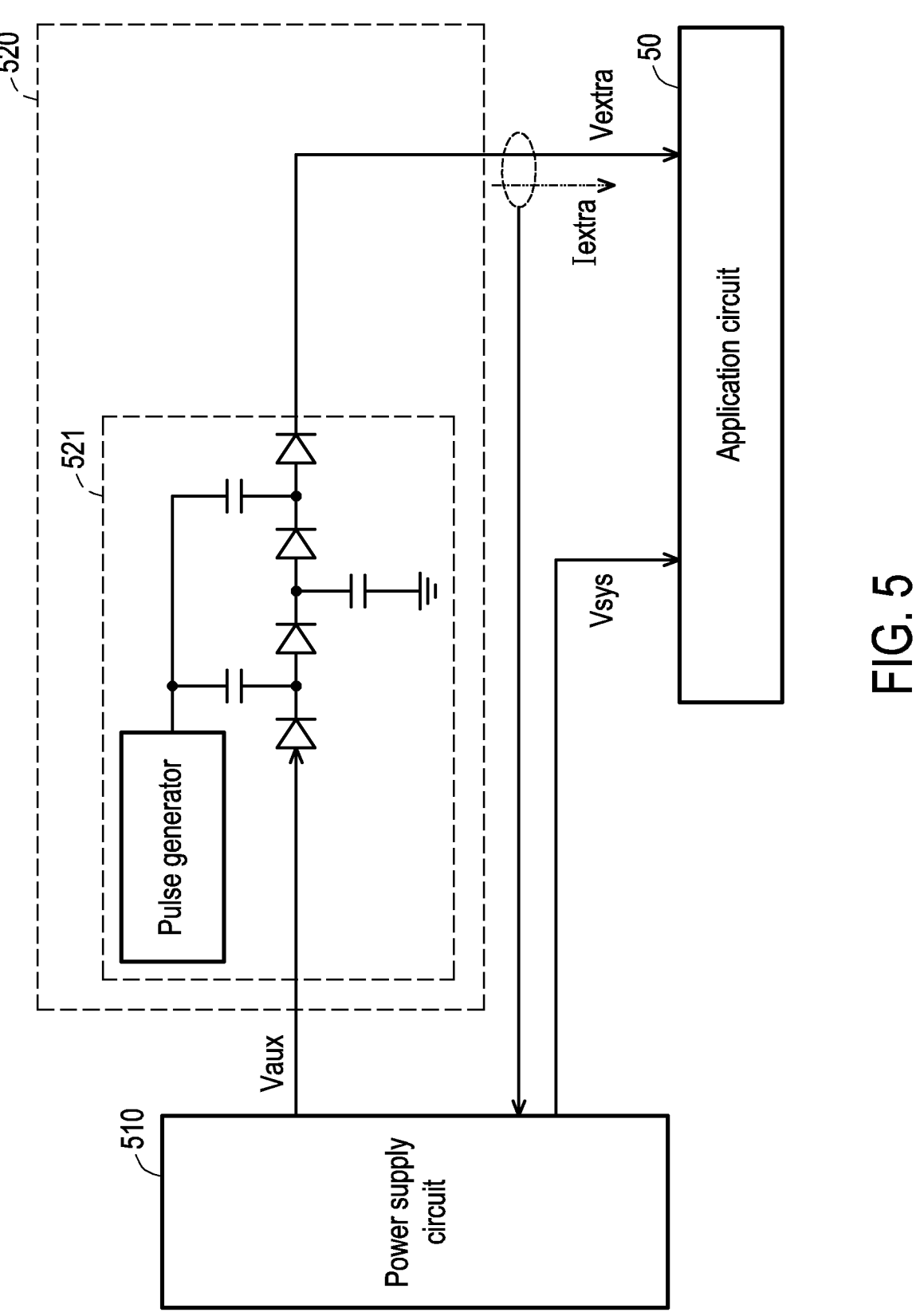
FIG. 5 is a circuit block schematic view of a charge pump circuit according to another embodiment of the disclosure.

FIG. 5 is a circuit block schematic view of a charge pump circuit 520 according to another embodiment of the disclosure. The power supply device shown in FIG. 5 includes a power supply circuit 510 and a charge pump circuit 520. The power supply device, the power supply circuit 510, and the charge pump circuit 520 shown in FIG. 5 may refer to the relevant descriptions of the power supply device 200, the power supply circuit 210, and the charge pump circuit 220 shown in FIG. 2 and may be deduced by analogy. The charge pump circuit 520 shown in FIG. 5 may be used as one of many implementation examples of the charge pump circuit 220 shown in FIG. 2.

In the embodiment shown in FIG. 5, the charge pump circuit 520 includes a charge pump 521. The charge pump 521 is coupled to the power supply circuit 510 to receive the power voltage Vaux. The charge pump 521 may convert the power voltage Vaux into the power voltage Vextra, and output the power voltage Vextra to the application circuit 50 and the power supply circuit 510. For the application circuit 50 shown in FIG. 5, reference may be made to the related description of the application circuit 10 shown in FIG. 1. The charge pump 521 may generate the output voltage (power voltage Vextra) greater than the input voltage (power voltage Vaux). The charge pump 521 shown in FIG. 5 is one of many implementation examples. The implementation of the charge pump 521 may be determined according to the actual design, and is not limited to the charge pump 521 shown in FIG. 5.

Figure 6:
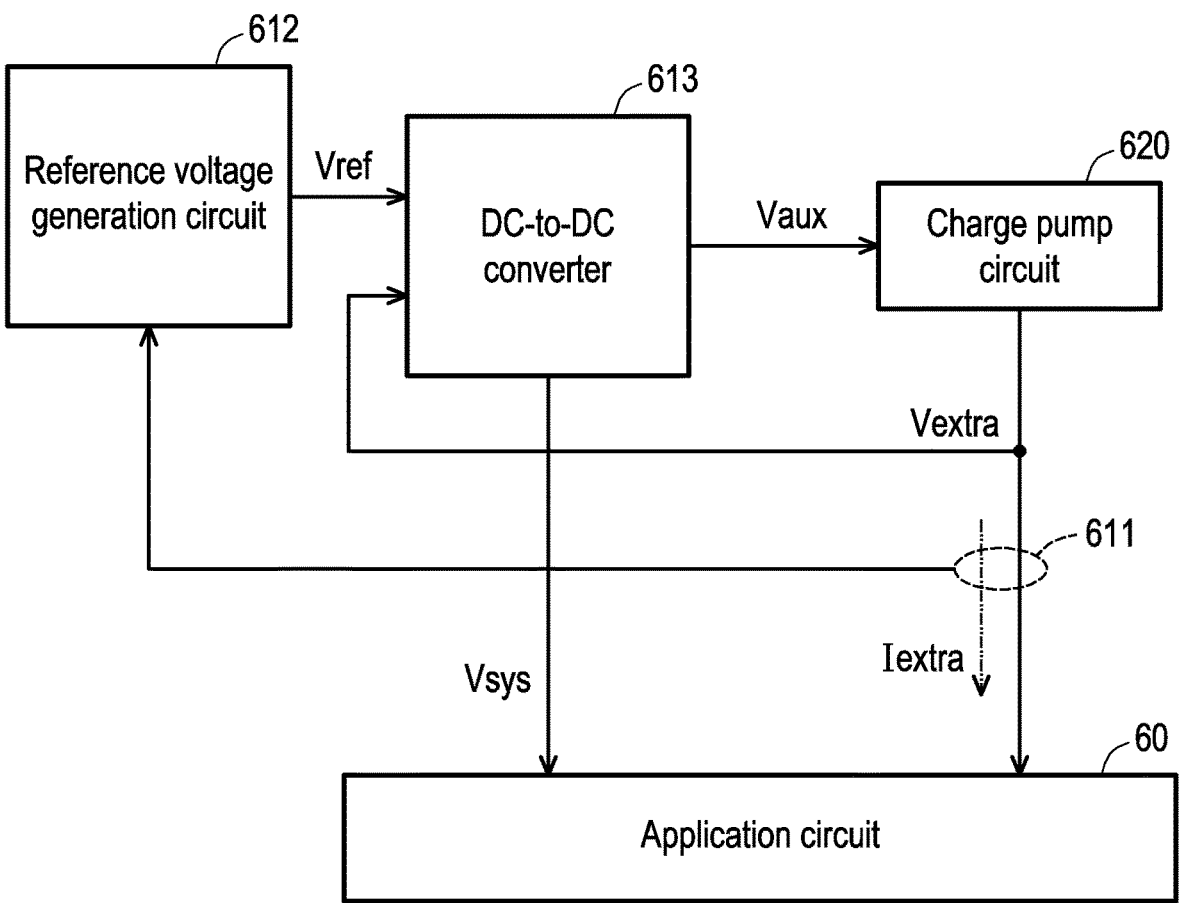
FIG. 6 is a circuit block schematic view of a power supply circuit according to an embodiment of the disclosure.

FIG. 6 is a circuit block schematic view of a power supply circuit 610 according to an embodiment of the disclosure. The power supply device shown in FIG. 6 includes a power supply circuit 610 and a charge pump circuit 620. The power supply device, the power supply circuit 610, and the charge pump circuit 620 shown in FIG. 6 may refer to the relevant descriptions of the power supply device 200, the power supply circuit 210, and the charge pump circuit 220 shown in FIG. 2 and may be deduced by analogy. The power supply circuit 610 shown in FIG. 6 may be used as one of many implementation examples of the power supply circuit 210 shown in FIG. 2. The charge pump circuit 620 shown in FIG. 6 may refer to the related description of the charge pump circuit 420 shown in FIG. 4 or the related description of the charge pump circuit 520 shown in FIG. 5, so details are not repeated herein.

In the embodiment shown in FIG. 6, the power supply circuit 610 includes a current sensor 611, a reference voltage generation circuit 612, and a DC-to-DC converter 613. The current sensor 611 senses the output current Iextra output from the charge pump circuit 620 to the application circuit 60 to obtain a detection result. For the application circuit 60 shown in FIG. 6, reference may be made to the related description of the application circuit 10 shown in FIG. 1. The current sensor 611 may be any type of current sensing element/circuit, such as a well-known current sensor or other current sensors. The reference voltage generation circuit 612 is coupled to the current sensor 611 to receive the detection result. The reference voltage generation circuit 612 generates a reference voltage Vref to the DC-to-DC converter 613. The reference voltage generation circuit 612 may dynamically adjust the reference voltage Vref based on the detection result of the current sensor 611. The DC-to-DC converter 613 is coupled to the reference voltage generation circuit 612 to receive the reference voltage Vref. The DC-to-DC converter 613 is coupled to the charge pump circuit 620 to receive the power voltage Vextra. The DC-to-DC converter 613 supplies the power voltage Vaux to the charge pump circuit 620. The DC-to-DC converter 613 may dynamically adjust the power voltage Vaux based on the relationship between the reference voltage Vref and the power voltage Vextra. The DC-to-DC converter 613 further supplies the system voltage Vsys to the application circuit 60.

Figure 7:
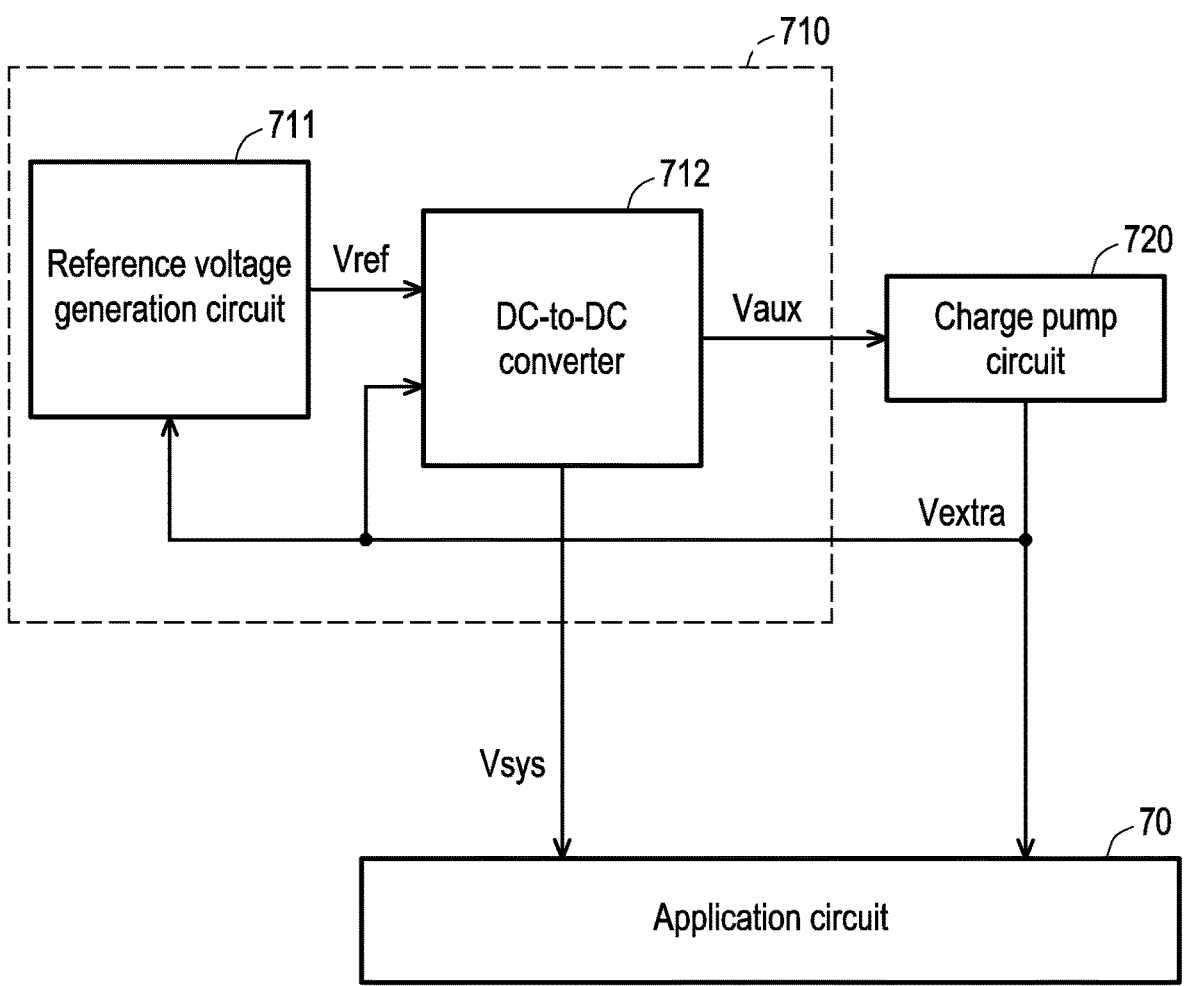
FIG. 7 is a circuit block schematic view of a power supply circuit according to another embodiment of the disclosure.

FIG. 7 is a circuit block schematic view of a power supply circuit 710 according to another embodiment of the disclosure. The power supply device shown in FIG. 7 includes a power supply circuit 710 and a charge pump circuit 720. The power supply device, the power supply circuit 710, and the charge pump circuit 720 shown in FIG. 7 may refer to the relevant descriptions of the power supply device 200, the power supply circuit 210, and the charge pump circuit 220 shown in FIG. 2 and may be deduced by analogy. The power supply circuit 710 shown in FIG. 7 may be used as one of many implementation examples of the power supply circuit 210 shown in FIG. 2. The charge pump circuit 720 shown in FIG. 7 may refer to the related description of the charge pump circuit 420 shown in FIG. 4 or the related description of the charge pump circuit 520 shown in FIG. 5, so details are not repeated herein.

In the embodiment shown in FIG. 7, the power supply circuit 710 includes a reference voltage generation circuit 711 and a DC-to-DC converter 712. The reference voltage generation circuit 711 senses the second power voltage Vextra output from the charge pump circuit 720 to the application circuit 70 to obtain a detection result. For the application circuit 70 shown in FIG. 7, reference may be made to the related description of the application circuit 10 shown in FIG. 1. The reference voltage generation circuit 711 generates a reference voltage Vref to the DC-to-DC converter 712. The reference voltage generation circuit 711 may dynamically adjust the reference voltage Vref based on the detection result. The DC-to-DC converter 712 is coupled to the reference voltage generation circuit 711 to receive the reference voltage Vref. The DC-to-DC converter 712 is coupled to the charge pump circuit 720 to receive the power voltage Vextra. The DC-to-DC converter 712 supplies the power voltage Vaux to the charge pump circuit 720. The DC-to-DC converter 712 may dynamically adjust the power voltage Vaux based on the relationship between the reference voltage Vref and the power voltage Vextra. The DC-to-DC converter 712 further supplies the system voltage Vsys to the application circuit 70.

Figure 8:
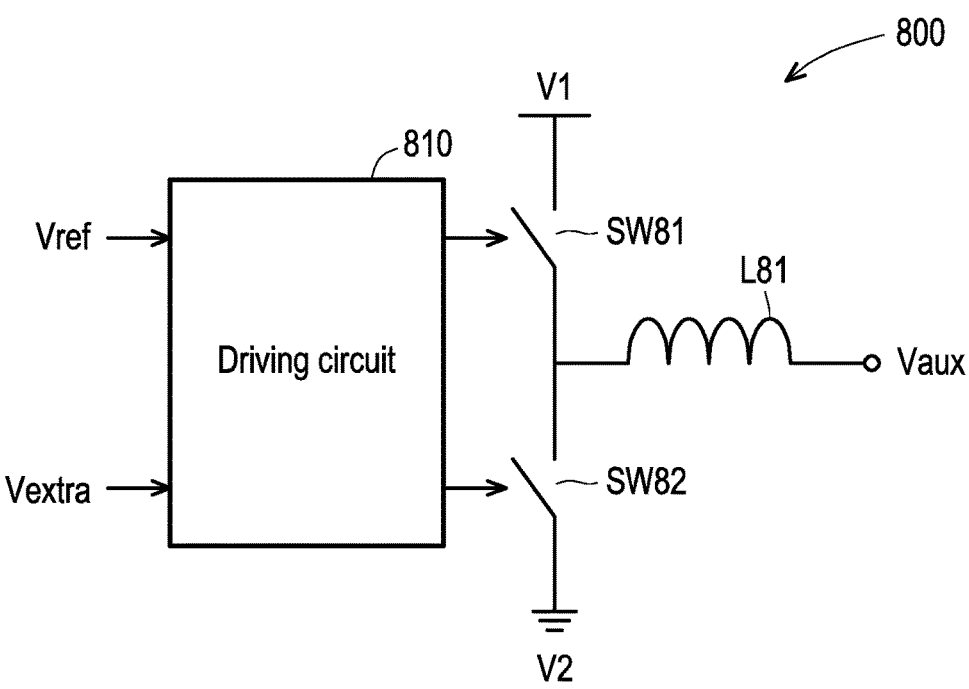
FIG. 8 is a circuit block schematic view of a DC-to-DC converter according to an embodiment of the disclosure.

FIG. 8 is a circuit block schematic view of a DC-to-DC converter 800 according to an embodiment of the disclosure. The DC-to-DC converter 800 shown in FIG. 8 may be used as one of many implementation examples of the DC-to-DC converter 613 shown in FIG. 6. The DC-to-DC converter 800 shown in FIG. 8 may also be used as one of many implementation examples of the DC-to-DC converter 712 shown in FIG. 7. In the embodiment shown in FIG. 8, the DC-to-DC converter 800 includes a driving circuit 810, an upper power switch SW81, a lower power switch SW82, and an inductor L81. The driving circuit 810 controls the upper power switch SW81 and the lower power switch SW82 based on the relationship between the reference voltage Vref and the power voltage Vextra. A first terminal of the upper power switch SW81 receives a voltage V1. A first terminal of the lower power switch SW82 receives a voltage V2. A first terminal of the inductor L81 is coupled to a second terminal of the upper power switch SW81 and a second terminal of the lower power switch SW82. A second terminal of inductor L81 supplies the power voltage Vaux to the charge pump circuit.

Figure 9:
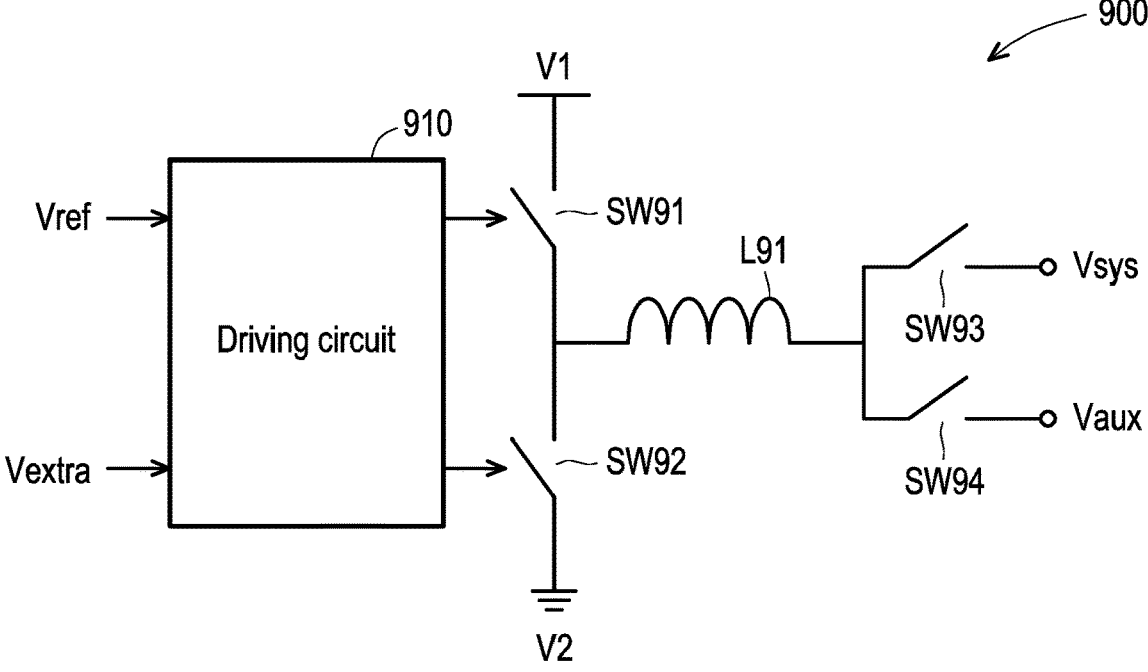
FIG. 9 is a circuit block schematic view of a DC-to-DC converter according to another embodiment of the disclosure.

FIG. 9 is a circuit block schematic view of a DC-to-DC converter 900 according to another embodiment of the disclosure. The DC-to-DC converter 900 shown in FIG. 9 may be used as one of many implementation examples of the DC-to-DC converter 613 shown in FIG. 6. The DC-to-DC converter 900 shown in FIG. 9 may also be used as one of many implementation examples of the DC-to-DC converter 712 shown in FIG. 7. In the embodiment shown in FIG. 9, the DC-to-DC converter 900 includes a driving circuit 910, an upper power switch SW91, a lower power switch SW92, an inductor L91, a switching switch SW93, and a switching switch SW94. The driving circuit 910 controls the upper power switch SW91 and the lower power switch SW92 based on the relationship between the reference voltage Vref and the power voltage Vextra. A first terminal of the upper power switch SW91 receives a voltage V1. A first terminal of the lower power switch SW92 receives a voltage V2. A first terminal of the inductor L91 is coupled to a second terminal of the upper power switch SW91 and a second terminal of the lower power switch SW92. A first terminal of a switching switch SW93 and a first terminal of a switching switch SW94 are coupled to a second terminal of the inductor L91. A second terminal of the switching switch SW93 supplies the system voltage Vsys to the application circuit. A second terminal of the switching switch SW94 supplies the power voltage Vaux to the charge pump circuit.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A power supply device, comprising:
a charge pump circuit, converting a first power voltage into a second power voltage so as to supply the second power voltage to an application circuit; and
a power supply circuit, coupled to the charge pump circuit to supply the first power voltage, wherein the power supply circuit detects the second power voltage output by the charge pump circuit to obtain a detection result, and the power supply circuit dynamically adjusts the first power voltage based on the detection result,
wherein the power supply circuit comprises:
a reference voltage generation circuit, sensing the second power voltage output from the charge pump circuit to the application circuit to obtain the detection result, wherein the reference voltage generation circuit generates a reference voltage, the reference voltage generation circuit dynamically adjusts the reference voltage based on the detection result, and the power supply circuit dynamically adjusts the first power voltage according to the reference voltage and the second power voltage.

2. The power supply device according to claim 1, wherein the charge pump circuit comprises:
a charge pump, coupled to the power supply circuit to receive the first power voltage, wherein the charge pump converts the first power voltage into the second power voltage, and outputs the second power voltage to the application circuit, wherein the power supply circuit detects the second power voltage.

3. The power supply device according to claim 1, wherein the power supply circuit comprises:
a DC-to-DC converter, coupled to the reference voltage generation circuit to receive the reference voltage, and coupled to the charge pump circuit to receive the second power voltage, wherein the DC-to-DC converter supplies the first power voltage to the charge pump circuit, and the DC-to-DC converter dynamically adjusts the first power voltage based on the relationship between the reference voltage and the second power voltage.

4. The power supply device according to claim 3, wherein the DC-to-DC converter comprises:
an upper power switch having a first terminal for receiving a first voltage;
a lower power switch having a first terminal for receiving a second voltage; and
an inductor having a first end coupled to a second terminal of the upper power switch and a second terminal of the lower power switch, wherein a second terminal of the inductor supplies the first power voltage to the charge pump circuit.

5. The power supply device according to claim 3, wherein the DC-to-DC converter further supplies a system voltage to the application circuit.

6. The power supply device according to claim 5, wherein the DC-to-DC converter comprises:

an upper power switch having a first terminal for receiving a first voltage;
a lower power switch having a first terminal for receiving a second voltage;
an inductor having a first terminal coupled to a second terminal of the upper power switch and a second terminal of the lower power switch;
a first switching switch having a first terminal coupled to a second terminal of the inductor, wherein a second terminal of the first switching switch supplies the first power voltage to the charge pump circuit; and
a second switching switch having a first terminal coupled to the second terminal of the inductor, wherein a second terminal of the second switching switch supplies the system voltage to the application circuit.

7. An operation method of a power supply device, comprising:
supplying a first power voltage by a power supply circuit of the power supply device;
converting the first power voltage into a second power voltage by a charge pump circuit of the power supply device, so as to supply the second power voltage to an application circuit;
detecting, by the power supply circuit, the second power voltage output by the charge pump circuit to obtain a detection result;
dynamically adjusting, by the power supply circuit, the first power voltage based on the detection result;
generating a reference voltage by a reference voltage generation circuit of the power supply circuit;
sensing the second power voltage output from the charge pump circuit to the application circuit to obtain the detection result by the reference voltage generation circuit;
dynamically adjusting the reference voltage based on the detection result by the reference voltage generation circuit; and
dynamically adjusting, by the power supply circuit, the first power voltage according to the reference voltage and the second power voltage.

8. The operation method according to claim 7, further comprising:
converting the first power voltage into the second power voltage by a charge pump of the charge pump circuit; and
outputting the second power voltage to the application circuit by the charge pump, wherein the power supply circuit detects the second power voltage.

9. The operation method according to claim 7, further comprising:
supplying the first power voltage to the charge pump circuit by a DC-to-DC converter of the power supply circuit; and
dynamically adjusting, by the DC-to-DC converter, the first power voltage based on the relationship between the reference voltage and the second power voltage.

10. The operation method according to claim 9, further comprising:
supplying a system voltage to the application circuit by the DC-to-DC converter.

* * * * *